(12) United States Patent
Kuboyama et al.

(10) Patent No.: US 9,715,301 B2
(45) Date of Patent: Jul. 25, 2017

(54) PROXIMITY EDGE SENSING

(71) Applicant: Apple Inc., Cupertino, CA (US)

(72) Inventors: Yuta Kuboyama, Cupertino, CA (US);
Vikram Garg, Cupertino, CA (US);
Richard D. Shuma, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/817,786

(22) Filed: Aug. 4, 2015

(65) Prior Publication Data
US 2017/0038877 A1    Feb. 9, 2017

(51) Int. Cl.
*G06F 3/041* (2006.01)
*G06F 3/044* (2006.01)
*G06F 3/045* (2006.01)

(52) U.S. Cl.
CPC ............ *G06F 3/0414* (2013.01); *G06F 3/044* (2013.01); *G06F 3/045* (2013.01); *G06F 3/0412* (2013.01); *G06F 3/0416* (2013.01); *G06F 2203/04102* (2013.01); *G06F 2203/04113* (2013.01)

(58) Field of Classification Search
CPC .... G06F 3/0414; G06F 3/0412; G06F 3/0416; G06F 3/044; G06F 3/045
See application file for complete search history.

(56) References Cited

U.S. PATENT DOCUMENTS

| | | |
|---|---|---|
| 4,527,862 A | 7/1985 | Arakawa |
| 5,343,064 A | 8/1994 | Spangler et al. |
| 6,002,389 A | 12/1999 | Kasser |
| 6,079,282 A | 6/2000 | Lanter |
| 6,154,580 A | 11/2000 | Kuriyama et al. |

(Continued)

FOREIGN PATENT DOCUMENTS

| | | |
|---|---|---|
| CN | 1577385 | 2/2005 |
| CN | 1582453 | 2/2005 |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Charles Hicks
(74) *Attorney, Agent, or Firm* — Brownstein Hyatt Farber Schreck, LLP (57) ABSTRACT

In various implementations, a sensor operates in a force sensing mode by determining an applied force based on a first change in capacitance between first and second electrodes related to compression of a compressible material positioned between while the third electrode functions as a shield and in a proximity sensing mode by sensing proximity of an object based on a second change in capacitance of the third electrode while the first and/or second electrodes function as a shield. In some implementations, a device has a cover glass including a surface having a display area, an edge surface, and a cavity; a touch sensing electrode oriented toward the surface; an electrode positioned in the cavity oriented toward the edge surface; and a processing unit operable to detect touch or proximity of an object to the edge surface based on a change in capacitance between the electrode and the object.

20 Claims, 10 Drawing Sheets

(56) References Cited

U.S. PATENT DOCUMENTS

| | | |
|---|---|---|
| 6,323,846 B1 | 11/2001 | Westerman et al. |
| 6,545,495 B2 | 4/2003 | Warmack et al. |
| 6,568,275 B2 | 5/2003 | Scholz et al. |
| 6,570,557 B1 | 5/2003 | Westerman et al. |
| 6,570,707 B1 | 5/2003 | Murakami |
| 6,677,932 B1 | 1/2004 | Westerman |
| 6,989,728 B2 | 1/2006 | Van Zeeland et al. |
| 7,158,122 B2 | 1/2007 | Roberts |
| 7,211,885 B2 | 5/2007 | Nordal et al. |
| 7,511,702 B2 | 3/2009 | Hotelling |
| 7,538,760 B2 | 5/2009 | Hotelling et al. |
| 7,609,178 B2 | 10/2009 | Son et al. |
| 7,719,522 B2 | 5/2010 | Lyon et al. |
| 7,784,366 B2 | 8/2010 | Daverman et al. |
| 7,920,134 B2 | 4/2011 | Krah |
| 7,920,225 B2 | 4/2011 | Nishikawa et al. |
| 8,072,437 B2 | 12/2011 | Miller et al. |
| 8,169,332 B2 | 5/2012 | Son |
| 8,169,416 B2 | 5/2012 | Han |
| 8,253,711 B2 | 8/2012 | Kim et al. |
| 8,274,495 B2 | 9/2012 | Lee |
| 8,334,849 B2 | 12/2012 | Murphy et al. |
| 8,351,993 B2 | 1/2013 | Nunes |
| 8,390,481 B2 | 3/2013 | Pance et al. |
| 8,421,978 B2 | 4/2013 | Wang et al. |
| 8,436,823 B2 | 5/2013 | Kanehira et al. |
| 8,547,350 B2 | 10/2013 | Anglin et al. |
| 8,577,289 B2 | 11/2013 | Schlub et al. |
| 8,577,644 B1 | 11/2013 | Ksondzyk et al. |
| 8,633,916 B2 | 1/2014 | Bernstein et al. |
| 8,638,316 B2 | 1/2014 | Badaye et al. |
| 8,669,963 B2 | 3/2014 | Baker et al. |
| 8,711,122 B2 | 4/2014 | Wada et al. |
| 8,743,083 B2 | 6/2014 | Zanone et al. |
| 8,760,413 B2 | 6/2014 | Peterson et al. |
| 8,780,055 B2 | 7/2014 | Marchand et al. |
| 8,830,205 B2 | 9/2014 | Chang et al. |
| 8,922,523 B2 | 12/2014 | Lynch et al. |
| 8,963,874 B2 | 2/2015 | Li et al. |
| 9,001,080 B2 | 4/2015 | Okayama et al. |
| 9,024,907 B2 | 5/2015 | Bolender |
| 9,030,440 B2 | 5/2015 | Pope et al. |
| 9,086,768 B2 | 7/2015 | Elias et al. |
| 9,088,282 B2 | 7/2015 | Holenarsipur et al. |
| 9,092,129 B2 | 7/2015 | Abdo et al. |
| 9,116,569 B2 | 8/2015 | Stacy et al. |
| 9,229,587 B2 | 1/2016 | Kawaguchi et al. |
| 9,262,002 B2 | 2/2016 | Momeyer et al. |
| 9,354,752 B2 | 5/2016 | Kanehira et al. |
| 9,430,102 B2 | 8/2016 | Prest et al. |
| 9,454,268 B2 | 9/2016 | Badaye et al. |
| 9,477,342 B2 | 10/2016 | Daverman et al. |
| 2006/0197753 A1 | 9/2006 | Hotelling |
| 2007/0272919 A1 | 11/2007 | Mori et al. |
| 2009/0015564 A1 | 1/2009 | Ye et al. |
| 2009/0066345 A1 | 3/2009 | Klauk et al. |
| 2009/0237374 A1 | 9/2009 | Li et al. |
| 2010/0045628 A1 | 2/2010 | Gettemy et al. |
| 2010/0117989 A1 | 5/2010 | Chang |
| 2010/0123686 A1 | 5/2010 | Klinghult et al. |
| 2010/0220065 A1 | 9/2010 | Ma |
| 2011/0012845 A1 | 1/2011 | Rothkopf et al. |
| 2011/0037706 A1 | 2/2011 | Pasquero et al. |
| 2011/0080373 A1 | 4/2011 | Wang et al. |
| 2011/0096013 A1 | 4/2011 | Krumpelman et al. |
| 2011/0227866 A1 | 9/2011 | Kawaguchi et al. |
| 2011/0227872 A1 | 9/2011 | Huska et al. |
| 2011/0235156 A1 | 9/2011 | Kothari et al. |
| 2011/0278078 A1* | 11/2011 | Schediwy ............ G01L 1/146 178/18.06 |
| 2012/0038577 A1 | 2/2012 | Brown et al. |
| 2012/0086669 A1 | 4/2012 | Kim et al. |
| 2012/0089348 A1 | 4/2012 | Perlin et al. |
| 2012/0090757 A1 | 4/2012 | Buchan et al. |
| 2012/0098760 A1 | 4/2012 | Chuang |
| 2012/0105358 A1 | 5/2012 | Momeyer et al. |
| 2012/0169612 A1 | 7/2012 | Alameh et al. |
| 2012/0188202 A1 | 7/2012 | Tsujino et al. |
| 2012/0274602 A1 | 11/2012 | Bita et al. |
| 2012/0313863 A1 | 12/2012 | Hsu |
| 2012/0319987 A1 | 12/2012 | Woo |
| 2013/0076375 A1 | 3/2013 | Hanumanthaiah et al. |
| 2013/0113732 A1 | 5/2013 | Kang et al. |
| 2013/0176270 A1 | 7/2013 | Cattivelli et al. |
| 2013/0234977 A1 | 9/2013 | Lin |
| 2013/0328575 A1 | 12/2013 | Ra et al. |
| 2014/0085247 A1 | 3/2014 | Leung et al. |
| 2014/0111953 A1* | 4/2014 | McClure ............ G06F 3/044 361/749 |
| 2014/0205799 A1* | 7/2014 | Lin ............ B29C 65/08 428/138 |
| 2015/0071509 A1 | 3/2015 | Myers |
| 2015/0135108 A1 | 5/2015 | Pope et al. |
| 2015/0185946 A1 | 7/2015 | Fourie |
| 2015/0378491 A1* | 12/2015 | Worfolk ............ G06F 3/0414 345/174 |
| 2016/0042166 A1 | 2/2016 | Kang et al. |
| 2016/0378255 A1 | 12/2016 | Butler et al. |

FOREIGN PATENT DOCUMENTS

| | | |
|---|---|---|
| CN | 1707415 | 12/2005 |
| CN | 1714336 | 12/2005 |
| CN | 101046720 | 10/2007 |
| CN | 101427468 | 5/2009 |
| CN | 101950224 | 1/2011 |
| CN | 102016780 | 4/2011 |
| CN | 201828892 | 5/2011 |
| CN | 102138120 | 7/2011 |
| CN | 102449583 | 5/2012 |
| CN | 102483673 | 5/2012 |
| EP | 2073107 | 6/2009 |
| EP | 2128747 | 12/2009 |
| EP | 2267791 | 12/2010 |
| EP | 2315102 | 4/2011 |
| EP | 2315186 | 4/2011 |
| EP | 2357547 | 8/2011 |
| EP | 2413224 | 2/2012 |
| EP | 2418561 | 2/2012 |
| EP | 2420918 | 2/2012 |
| EP | 2508960 | 10/2012 |
| EP | 2660688 | 11/2013 |
| GB | 2313195 | 11/1997 |
| JP | 2007310539 | 11/2007 |
| JP | 2010244252 | 10/2010 |
| JP | 2014052997 | 3/2014 |
| WO | WO 97/18528 | 5/1997 |
| WO | WO 2011/156447 | 12/2011 |
| WO | WO 2012/031564 | 3/2012 |
| WO | WO 2012/160844 | 11/2012 |
| WO | WO 2013/083207 | 6/2013 |
| WO | WO 2014/018121 | 1/2014 |
| WO | WO 2014/124173 | 8/2014 |

OTHER PUBLICATIONS

Engineers Edge, Common Plastic Molding Design Material Specification, 2015, http://www.engineersedge.com/plastic/materials_common_plastic.htm, 3 pages.

Feist, "Samsung snags patent for new pressure sensitive touchscreens," posted on AndroidAuthority.com at URL: http://www.androidauthority.com/samsung-patent-pressure-sensitive-touch-screens-354860, Mar. 7, 2014, 1 page.

Widdle, "Measurement of the Poisson's ratio of flexible polyurethane foam and its influence on a uniaxial compression model," International Journal of Engineering Science, vol. 46, 2008, pp. 31-49.

* cited by examiner

PROXIMITY EDGE SENSING

FIELD

The described embodiments relate generally to proximity sensing. More particularly, the present embodiments relate to proximity and/or touch sensing of edges of an electronic device.

BACKGROUND

Many electronic devices include one or more input devices for receiving input from a user and one or more output devices for providing output to a user. For example, input may be received via one or more keyboards, mice, track pads, buttons, knobs, microphones, and so on. By way of another example, output may be provided via one or more display screens, speakers, haptic devices, and so on.

Some electronic devices may include a touch screen in order to receive input and/or provide output. Such a touch screen may include a display that presents output in a display area and one or more touch sensing elements that detect touch in the display area. As such, a user may be able to interact with elements of a graphical user interface presented on the display by touch.

SUMMARY

The present disclosure relates to proximity and/or touch sensing of edges of an electronic device.

In various implementations, a combined proximity and force sensor may include first and second electrodes separated by a compressible material and an additional third electrode. The combined proximity and force sensor may operate in a force sensing mode by determining an applied force based on a first change in capacitance between the first and second electrodes related to compression of the compressible material while the third electrode functions as a force sensing ground shield. The combined proximity and force sensor may operate in a proximity sensing mode by sensing proximity of an object based on a second change in capacitance of the third electrode while the first and/or second electrodes functions as a proximity sensing ground shield.

In some implementations, an electronic device may include a touch display with a cover glass surface having a display area, a cover glass edge surface, and a cavity formed around a perimeter of the touch display. One or more capacitive or other touch sensing electrodes may be positioned on the cover glass opposite the cover glass surface in the display area, oriented toward the cover glass surface. The cover glass may also include an opaque material positioned in the cavity and one or more electrodes positioned on the opaque material, oriented toward the cover glass edge surface. The electronic device may detect touch or proximity to the cover glass edge surface based on a change in capacitance of the electrode.

In various embodiments, a combined proximity and force sensor may include a first electrode, a second electrode, a compressible material separating the first and second electrodes, and a third electrode coupled to the first electrode. The combined proximity and force sensor may operable to produce a first signal indicating a first change in capacitance between the first and second electrodes related to compression of the compressible material while the third electrode functions as a force sensing ground shield, the first signal usable by a processing unit to determine an applied force, and produce a second signal indicating a second change in capacitance of the third electrode while the first electrode functions as a proximity ground shield, the second signal usable by the processing unit to sense proximity of an object. The combined proximity and force sensor may produce the first and second signals at different times.

In some examples, the combined proximity and force sensor may further include a fourth electrode and the second change in capacitance may be a mutual capacitance between the third electrode and the fourth electrode. The fourth electrode may be disposed on at least one of a cavity in a cover glass of an electronic device or an input mechanism of the electronic device. The electronic device may incorporate the combined proximity and force sensor.

In various examples, the third electrode may be multiple third electrodes positioned at select locations around a perimeter of a cover glass and the combined proximity and force sensor may be operable to the combined proximity and force sensor is operable to produce signals indicating changes in capacitance for each of the multiple third electrodes separately.

In some examples, the second electrode may function as an additional proximity ground shield while the combined proximity and force sensor produces the second signal. In various examples, the combined proximity and force sensor may be a gasket. In some examples, the proximity may be to an input mechanism of an electronic device. The input mechanism may be adjacent to the combined proximity and force sensor.

In some embodiments, an electronic device may have a cover glass including a cover glass surface having a display area, a cover glass edge surface, and a cavity. The electronic device may also have a capacitive touch sensing electrode positioned on the cover glass opposite the cover glass surface in the display area, oriented toward the cover glass surface; an electrode positioned in the cavity, oriented toward the cover glass edge surface; and a processing unit connected to the electrode that is to detect touch or proximity of an object to the cover glass edge surface based on a change in capacitance between the electrode and the object.

In some examples, electronic device may further include an opaque material positioned in the cavity. The electrode may be positioned on the opaque material.

In various examples, the electrode may be laminated to a flexible circuit positioned in the cavity. In some examples, the electrode may be disposed on a non-conductive structure that is adhered to the cavity. In various examples, the electronic device may also include an antenna element positioned in the cavity and the electrode may be disposed on a support structure of the antenna element positioned in the cavity. In some examples, the electrode may include at least one of conductive paste, sputter conductor, indium tin oxide, or metal foil applied to the opaque material.

In some examples, the electrode may be multiple electrodes and the electronic device may be operable to detect touch of an area corresponding to or proximity to one of the multiple electrodes based on a change in capacitance of the respective electrode.

In various embodiments, a method of controlling a combined proximity and force sensor may include operating the combined proximity and force sensor in a force sensing mode by determining an applied force based on a first change in capacitance between a first electrode and a second electrode while using a third electrode as a force sensing ground shield, operating the combined proximity and force sensor in a proximity sensing mode by sensing proximity of an object based on a second change in capacitance of the third electrode while using the first electrode as a proximity sensing ground shield, and switching the combined proximity and force sensor between the proximity sensing mode and the force sensing mode.

In various examples, switching the combined proximity and force sensor between the proximity sensing mode and the force sensing mode may include performing combined proximity and force sensing cycles wherein a portion of each proximity and force sensing cycle includes operating for a first period of time in the force sensing mode and a second period of time in the proximity sensing mode.

In some examples, the method may further include changing a displayed element of a user interface based on the detected proximity. The proximity may be to an input mechanism and the displayed element of the user interface may be alterable by manipulating the input mechanism.

In various examples, the method may also include initiating an action based on a combination of the sensed proximity and a detected touch input.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The present disclosure relates to proximity and/or touch sensing of edges of an electronic device. In various implementations, a combined proximity and force sensor may include first and second electrodes separated by a compressible material and an additional third electrode. The combined proximity and force sensor may operate in a force sensing mode by determining an applied force based on a first change in capacitance between the first and second electrodes related to compression of the compressible material. In this force sensing mode, the third electrode may function as a force sensing ground shield. The combined proximity and force sensor may operate in a proximity sensing mode by sensing proximity of an object based on a second change in capacitance of the third electrode. In this proximity sensing mode, the first and/or second electrodes may function as a proximity sensing ground shield. In this way, components of a combined proximity and force sensor may be used to detect both touch and force by using the components to perform different functions at different times.

The detected proximity may be used in a variety of ways. The proximity sensing mode may be used to detect when a user's body part (such as a finger) or a conductive stylus is proximate to an input device, an edge of a cover glass of a touch or other display, various edges of the cover glass or another edge of an electronic device, and so on.

In various examples of such implementations, the change in capacitance of the third electrode in the proximity sensing mode may result from the proximity of a user's body part to the third electrode. The capacitance may be between the third electrode and the user's body part and/or a fourth electrode. Such a fourth electrode may be disposed on the input mechanism of an electronic device, a cavity in the cover glass, and so on.

In some implementations, an electronic device may include a touch display. The touch display may include a cover glass with a cover glass surface having a display area, a cover glass edge surface, and a cavity formed around a perimeter of the touch display. One or more capacitive or other touch sensing electrodes may be positioned on the cover glass opposite the cover glass surface in the display area, oriented toward the cover glass surface. The cover glass may also include an opaque material positioned in the cavity and one or more electrodes positioned on the opaque material, oriented toward the cover glass edge surface. The electronic device may detect touch or proximity to the cover glass edge surface based on a change in capacitance of the electrode. In this way, touch and/or proximity to the edge of the electronic device may be utilized as input in addition to touch to the display area.

The electrode may be positioned on the opaque material in a variety of ways. In some examples, the electrode may be laminated to a flexible circuit and/or disposed on a non-conductive structure positioned in the cavity. In other examples, an antenna element may be positioned in the cavity and the electrode may be disposed on a support structure of the antenna element. In still other examples, the electrode may be conductive material directly applied to the opaque material, such as conductive paste, sputter conductor, metal foil, and so on.

In various implementations, a combined proximity and force sensor may be controlled by operating in a force sensing mode, operating in a proximity sensing mode, and switching between the force sensing mode and the proximity sensing mode. Switching between the force sensing mode and the proximity sensing mode may include performing combined proximity and force sensing cycles wherein a portion of each cycle includes operating for a first period of time in the force sensing mode and a second series of time in the proximity sensing mode.

In the present disclosure, determination of applied force may refer to determining pressure exerted by an object to a surface or other object. Sensing of proximity may refer to sensing that an object is touching a surface or other object or is nearby to the surface or other object.

These and other embodiments are discussed below with reference to FIGS. 1-12. However, those skilled in the art will readily appreciate that the detailed description given herein with respect to these Figures is for explanatory purposes only and should not be construed as limiting.

Figure 1:
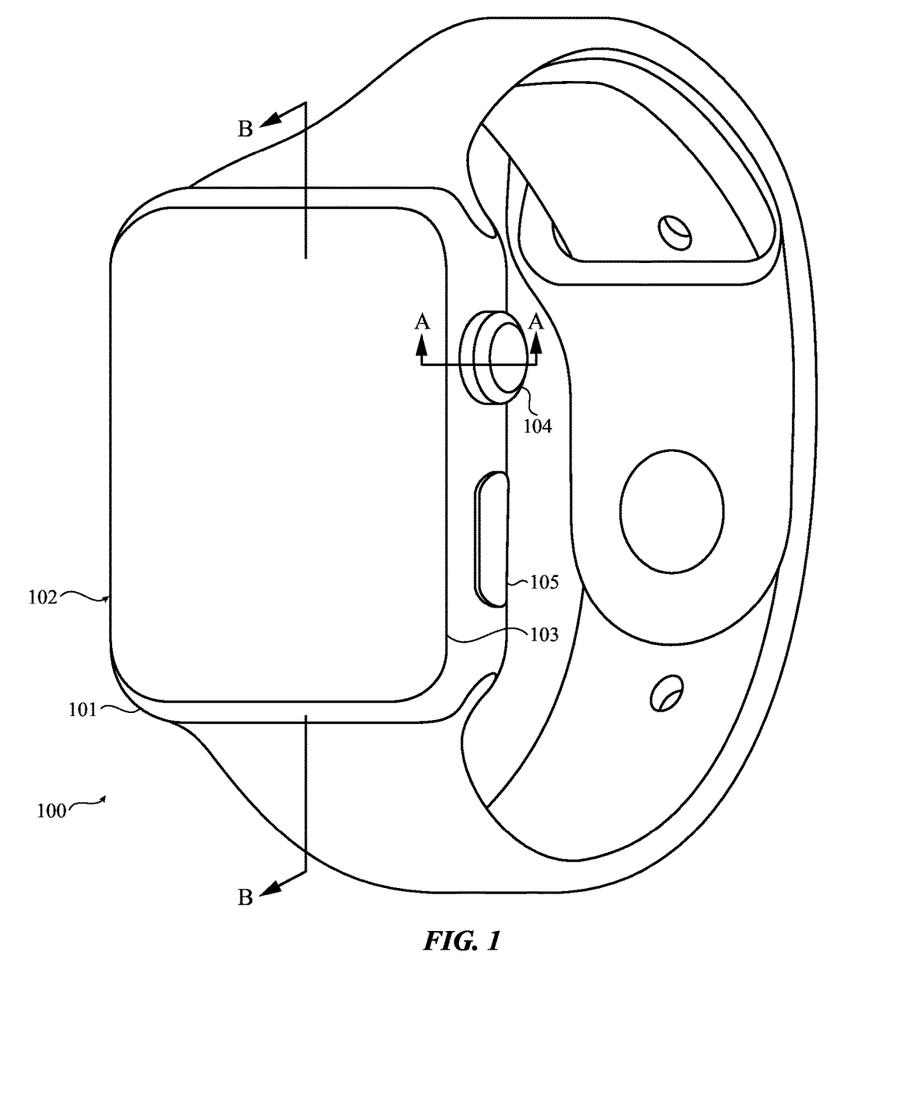
FIG. 1 shows an isometric view of an example electronic device that includes proximity sensing.

FIG. 1 is an isometric view of an example electronic device 100 that includes proximity sensing. The electronic device 100 may include a housing 101, a touch display 102 (which, with reference to FIG. 5, may include a cover glass 524, touch sensing electrodes 517, display components, and so on) with a cover glass edge surface 103, and/or one or more input mechanisms 104 and 105. The electronic device 100 may include one or more combined proximity and force sensors and/or other proximity and touch sensors operable to detect touch or proximity to the cover glass edge surface 103 and/or an edge of the housing 101.

In some implementations, the one or more combined proximity and force sensors and/or other proximity and touch sensors may be utilized to detect that the electronic device 100 is currently worn. The electronic device 100 may operate in different states depending on whether or not the electronic device 100 is being worn by a user and the combined proximity and force sensors and/or other proximity and touch sensors may be used to determine such. For example, proximity or touch of the electronic device 100 to a user's wrist may be detected.

Although the electronic device 100 is illustrated as a wearable device, it is understood that this is an example. In various implementations, the electronic device 100 may be a laptop computing device, a desktop computing device, a fitness monitor, a digital media player, a cellular telephone, a smart phone, a display, a printer, a wearable device, a mobile computing device, a tablet computing device, and/or any other electronic device without departing from the scope of the present disclosure.

Further, although the input mechanisms 104 and 105 are illustrated as a knob and a button, respectively, it is understood that these are examples. In various implementations, the electronic device 100 may include any number of input mechanisms of varying different types without departing from the scope of the present disclosure.

Figure 2:
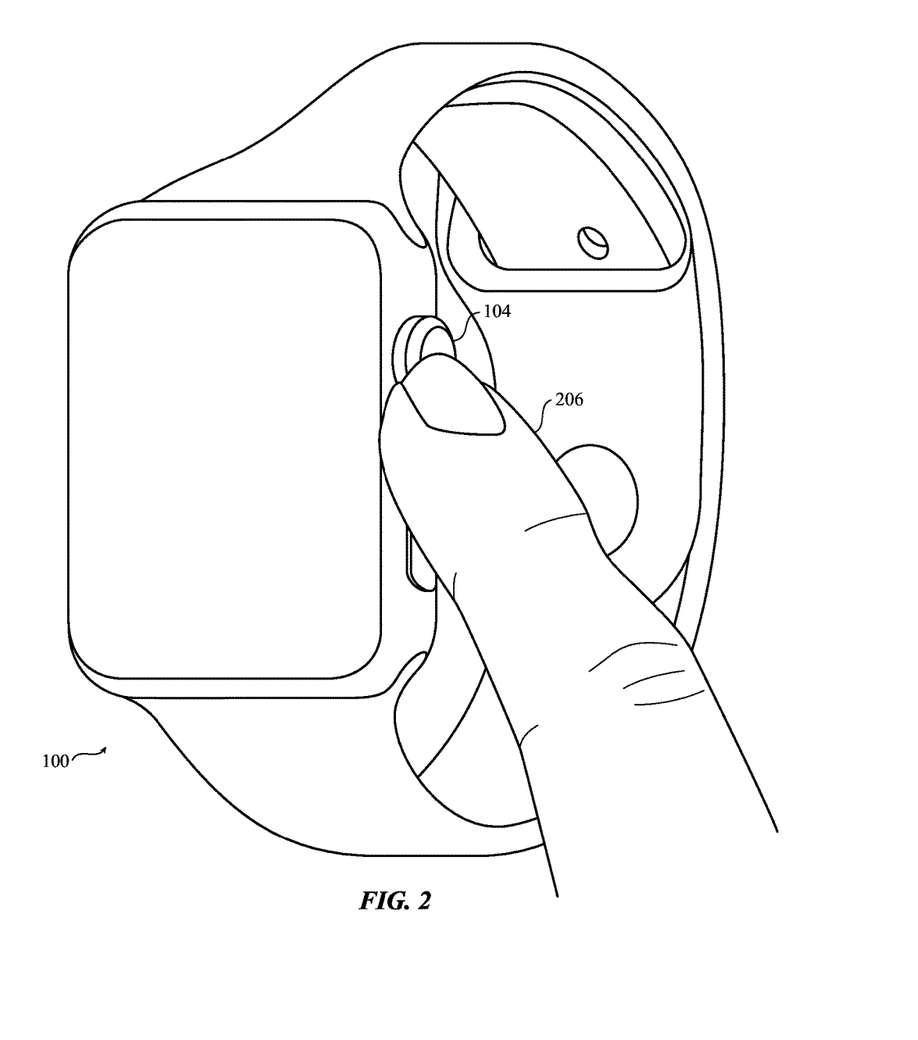
FIG. 2 shows sensing proximity or touch to an input mechanism and/or edge of the electronic device of FIG. 1.

FIG. 2 illustrates sensing proximity or touch to an input mechanism 104 or 105 and/or an edge of the electronic device 100 of FIG. 1. As shown, a user's finger 206 is proximate to the input mechanism 104. The electronic device 100 may utilize one or more combined proximity and force sensors and/or other proximity/touch sensors to detect the proximity of the user's finger 206 and perform one or more actions based thereon. For example, the electronic device 100 may change a displayed element of a graphical user interface being presented to indicate how that displayed element may be altered by manipulating the input mechanism 104 (such as by turning the input mechanism 104, pressing the input mechanism 104, turning the input mechanism 104 in a first direction or a second direction, and so on).

Figure 3:
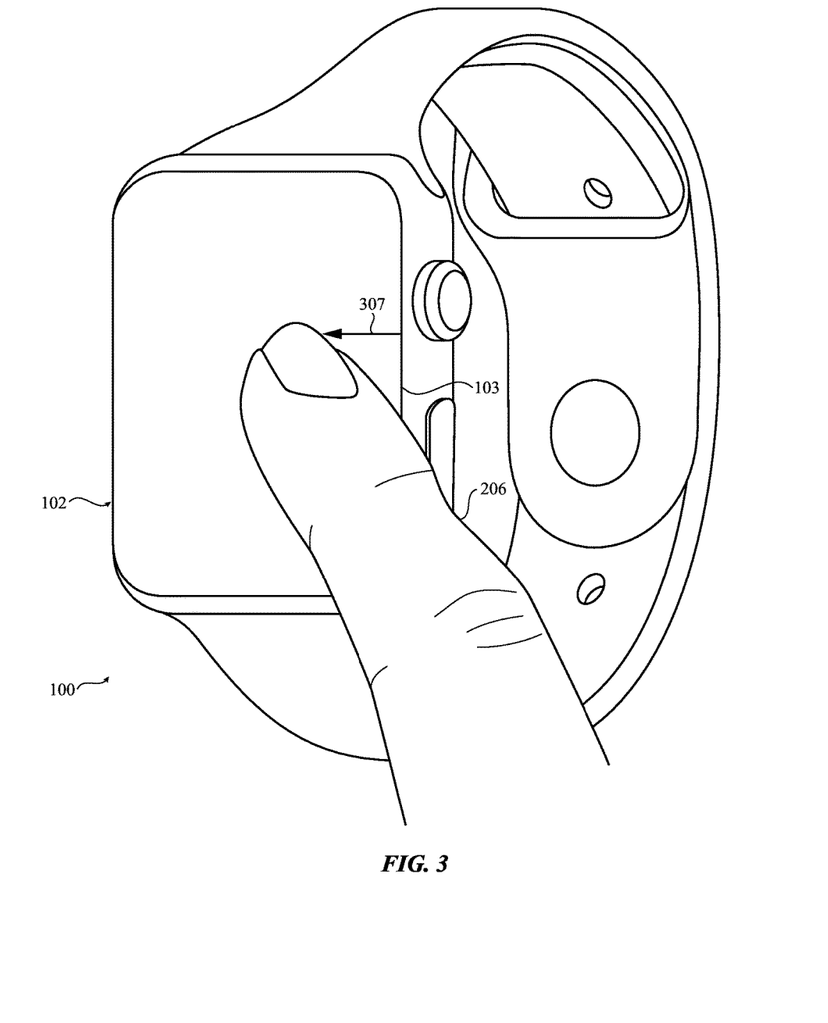
FIG. 3 shows a combination of sensing touch on a display and proximity or touch to an edge of the electronic device of FIG. 1.

FIG. 3 illustrates a combination of sensing touch on a display and proximity or touch to an edge of the electronic device 100 of FIG. 1. As shown, a user's finger 206 touches the edge 103 of the touch display 102 and then slides across the touch display 102 in the direction 307. The electronic device 100 may utilize one or more combined proximity and force sensors and/or other proximity/touch sensors to detect the touch of the user's finger 206 to the edge 103 and the touch screen 102 to detect the following slide in the direction 307. The electronic device 100 may then perform one or more actions based thereon. For example, the electronic device 100 may display a first menu when a sliding touch in the direction 307 starting on the touch display 102 is detected but may display a second menu when a sliding touch in the direction 307 starting on at the edge 103 is detected.

Figure 4:
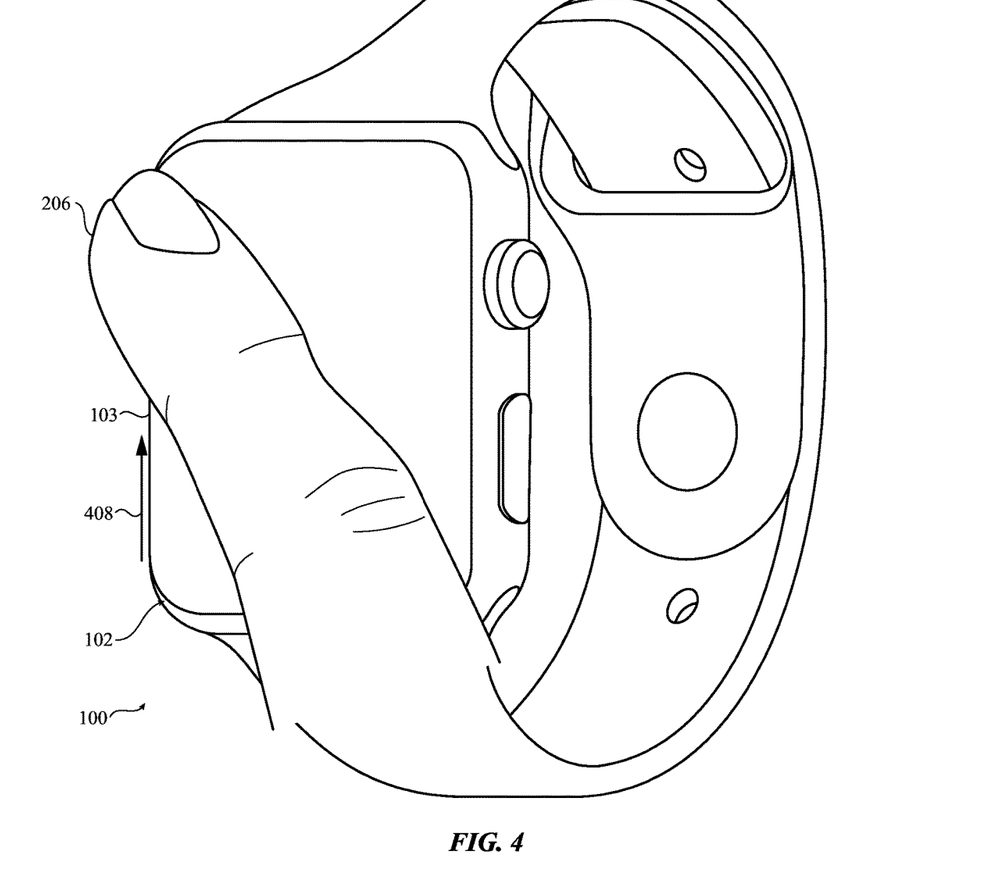
FIG. 4 shows sensing movement of proximity or touch on an edge of the electronic device of FIG. 1.

FIG. 4 illustrates sensing movement of proximity or touch on an edge of the electronic device 100 of FIG. 1. As shown, a user's finger 206 is moved in a direction 408 along an edge of the electronic device 100 (proximate to and/or touching) and adjacent to the edge 103 of the touch display 102. The electronic device 100 may utilize one or more combined proximity and force sensors and/or other proximity/touch sensors to detect the movement of the user's finger 206 in the direction 408 and perform one or more actions based thereon. For example, the electronic device 100 may increase a volume setting when movement of the user's finger 206 in the direction 408 (or decrease when movement of the user's finger 206 in an opposite direction) is detected. In another example, movement of the user's finger 206 in the direction 408 or in an opposite direction may be used to scroll through a graphical menu in a corresponding direction.

Figure 5:
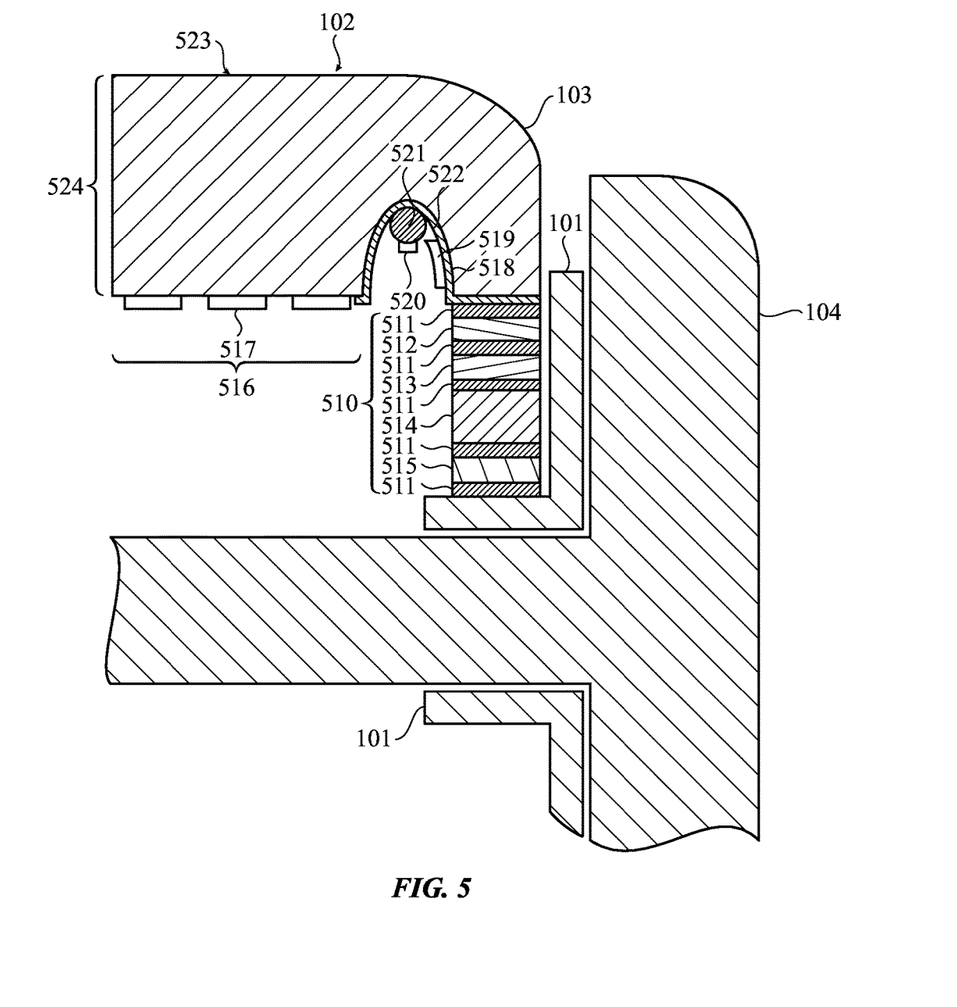
FIG. 5 shows a cross-sectional view of an example of the electronic device of FIG. 1, taken along the line A-A of FIG. 1.

FIG. 5 is a cross-sectional view of an example of the electronic device 100 of FIG. 1, taken along the line A-A of FIG. 1. The electronic device 100 may include a combined proximity and force sensors 510 (which may be adjacent to the input mechanism 104) and/or a proximity/touch sensor that utilizes an electrode 519.

In this example, the combined proximity and force sensors 510 may be positioned between the touch display 102 and the housing 101. The combined proximity and force sensors 510 may be continuous around an interior perimeter of the electronic device 100. The combined proximity and force sensors 510 may include a first electrode 513 separated from a second electrode 515 by a compressible material 514 (such as silicone). The first electrode 513, second electrode 515, and compressible material 514 may be coupled to each other and/or the housing 101 using layers of adhesives 511 (such as pressure sensitive adhesive, ultraviolet cured adhesive, two part epoxy, or other adhesives). The combined proximity and force sensors 510 may also include a third electrode 512, which may be coupled to the first electrode 513 and/or the touch display 102 using layers of adhesives 511.

The combined proximity and force sensors 510 may be operable in a number of different modes. The components of the combined proximity and force sensors 510 may function differently in the different modes. For example, the combined proximity and force sensors 510 may be operable in a force sensing mode and a proximity sensing mode.

Figure 8:
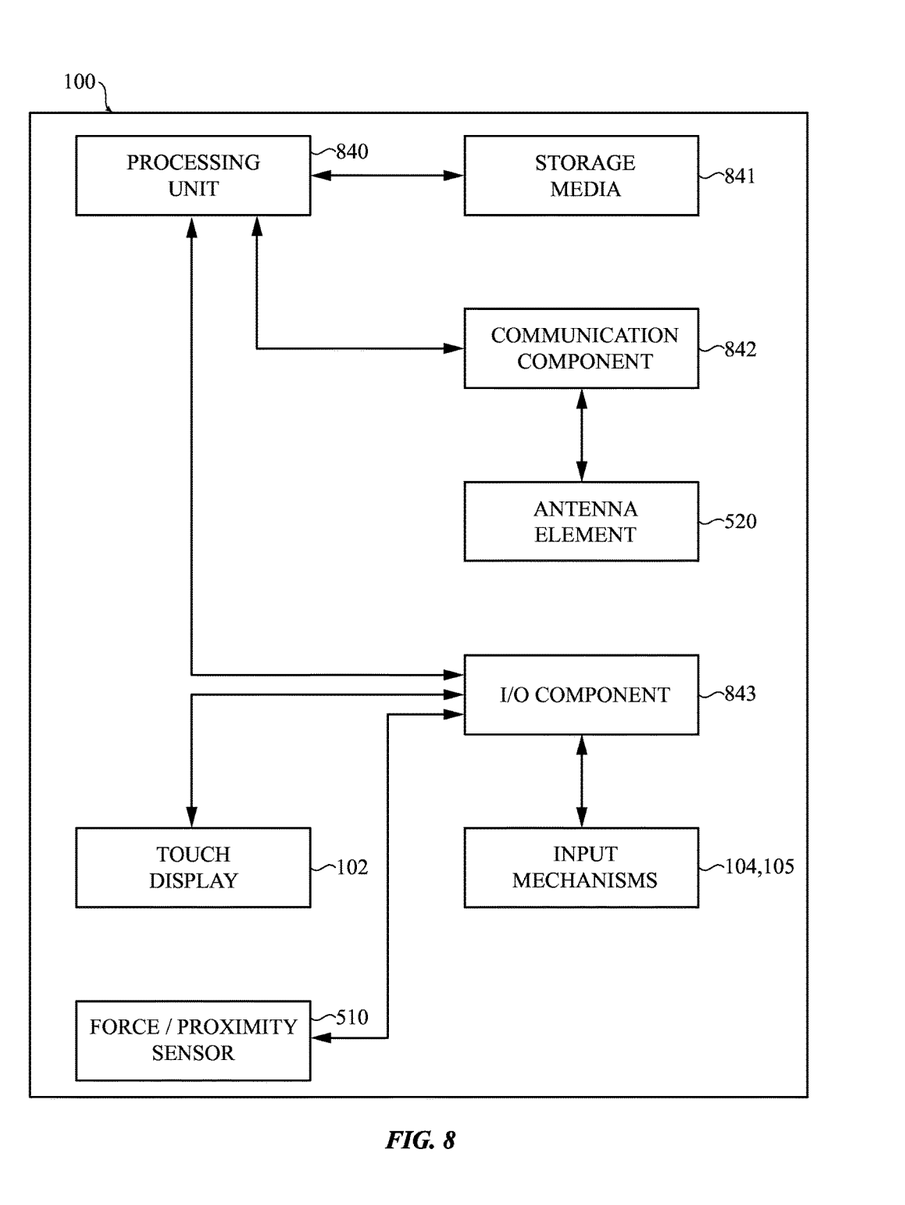
FIG. 8 shows a block diagram illustrating example functional relationships between example components of the electronic device of FIG. 1.

In a force sensing mode, a first capacitance between the first electrode 513 and the second electrode 515 may be measured (such as by the processing unit 840 of FIG. 8). A force exerted upon the touch display 102 may cause the compressible material 514 to compress, allowing the first electrode 513 and the second electrode 515 to move closer to each other. This may result in a change in the mutual capacitance between the first and second electrodes 513 and 515 and this change may be measured and correlated to an amount of force applied to the cover glass surface 523. Thus, the amount of the applied force may be determined.

For example, the combined proximity and force sensor 510 may produce a first signal indicating the mutual capacitance between the first and second electrodes 513 and 515 (a first change in capacitance). This first signal may be transmitted to the processing unit 840 of FIG. 8, which may correlated the first signal to an amount of force applied to the cover glass surface 523.

While in the force sensing mode, the third electrode 512 may function as a force sensing ground shield. The third electrode 512 may perform this function by shielding the first and second electrodes 513 and 515 from modulation caused by the object exerting the force (such as a user's finger or other body part, a conductive stylus, and so on), other components such as an antenna element 520, and/or other interferences. By shielding the first and second electrodes 513 and 515, the third electrode 512 may prevent or reduce interference with the mutual capacitance between the first and second electrodes 513 and 515, which may make force determinations more accurate.

In a proximity sensing mode, a second capacitance of the third electrode 512 may be measured. The second capacitance may be between the third electrode 512 and an object proximate to the cover glass edge surface 103, such as a user's finger or a conductive stylus. Alternatively, the second capacitance may be a mutual capacitance between the third electrode 512 and a fourth electrode. The fourth electrode may be an electrode 519, an electrode disposed on the input mechanism 104, and/or another such electrode. An object proximate to the cover glass edge surface 103 may change the capacitance between the third electrode 512 and the fourth electrode.

For example, the combined proximity and force sensor 510 may produce a second signal indicating the capacitance between the third electrode 512 and the fourth electrode (a second change in capacitance). This second signal may be transmitted to the processing unit 840 of FIG. 8, which may use the second signal to sense proximity of an object.

While in the proximity sensing mode, the first and/or second electrodes 513 and 515 may function as a proximity ground shield for the third electrode 512. The first and/or second electrodes 513 and 515 may perform this function by shielding the third electrode 512 from parasitics from the first and second electrodes 513 and 515 and/or components, and/or other interferences. By shielding the third electrode 512, the first and/or second electrodes 513 and 515 may prevent or reduce interference with the capacitance of the third electrode 512, which may make proximity determinations more accurate.

The combined proximity and force sensor 510 may switch between the force sensing mode and the proximity sensing mode. The combined proximity and force sensor 510 may be operable in a cycle where for a first period of time the combined proximity and force sensor 510 is operated in the force sensing mode and for a second period of time the combined proximity and force sensor 510 is operated in the proximity sensing mode.

For example, such a cycle may be approximately 20 milliseconds. Of the 20 milliseconds, the combined proximity and force sensor 510 may be operated in the force sensing mode for 15 milliseconds. Switching from the force sensing mode to the proximity sensing mode may take one millisecond. The combined proximity and force sensor 510 may be operated in the proximity sensing mode for 3 milliseconds. Switching from the proximity sensing mode to the force sensing mode may take one millisecond, completing a cycle.

In some implementations, the combined proximity and force sensor 510 may repeatedly cycle between the force sensing mode and the proximity sensing mode. In other implementations, the combined proximity and force sensor 510 may operate in the proximity sensing mode and then cycle once proximity is detected. In still other implementations, the combined proximity and force sensor 510 may operate in the force sensing mode and may cycle once force is detected.

In various implementations, one or more portions of the combined proximity and force sensor 510 may function as a gasket for the electronic device 100. Such a gasket may be a seal between the touch display 102 and the housing 101 and/or between other components. This seal may prevent contaminants such as liquids or dust from entering the electronic device 100.

Figure 6:
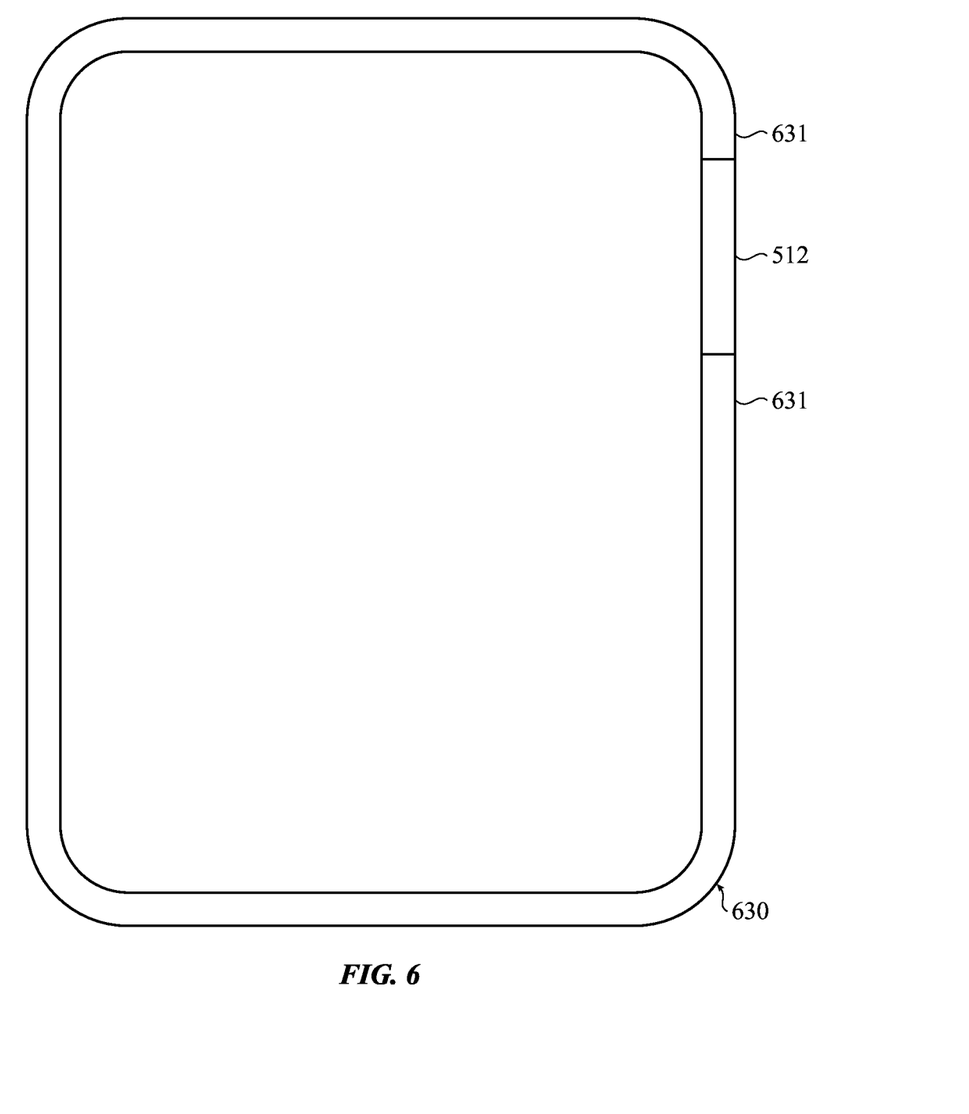
FIG. 6 shows a front view of the third electrode illustrated in FIG. 5 with other components removed for clarity.

For example, FIG. 6 illustrates a front view of the third electrode 512 illustrated in FIG. 5 with other components removed for clarity. The electrode 512 may be a portion of a larger electrode 630 that also includes a portion 631 (which may be formed of the same material as the electrode 512 or a different material) and forms a perimeter adjacent to the touch display 102 within the housing 101. The electrode 512 may be separated from the portion 631 such that the electrode 512 may be used separately from the portion 631 for proximity sensing but electrode 512 and the portion 631 may be located sufficiently proximate to each other that the larger electrode 630 as a whole is operable to function as a force sensing grounding shield for any first and second electrodes 513 and 515 positioned beneath the larger electrode 630.

Although the electrode 512 is illustrated as a single discrete portion of the larger electrode, it is understood that this is an example. In various implementations, multiple electrodes 512 may be utilized that are positioned at select locations as part of the larger electrode. Proximity or touch to each of the multiple electrodes 512 may be separately measured such that proximity at and/or touch to various edges of the electronic device 100 may be determined. In other words, signals indicating changes in capacitance for each of the multiple electrodes 512 may be produced separately and transmitted to a processing unit to determine proximity to the each multiple electrodes 512 separately thereby.

Further, although a single first electrode 513, second electrode 515, and compressible material 514 are illustrated and described above with respect to FIG. 5, it is understood that this is an example. In various implementations, multiple first electrodes 513, second electrodes 515, and compressible materials 514 may be configured between the touch display 102 and the housing 101 in order to determine force applied at different areas.

The electrode 512 may be separated from the portion 631 by one or more gaps such that the electrode 512 and the portion 631 are electrically isolated from each other. The gaps may be configured such that the larger electrode as a whole is operable to function as a force sensing grounding shield for any first and second electrodes 513 and 515 positioned beneath the larger electrode 630 without any such gaps impairing such shielding.

Returning to FIG. 5, a proximity/touch sensor included in the electronic device 100 may include the electrode 519. The touch display 102 may include a cover glass 524 (such as a cover glass made of sapphire, glass, and/or other such materials) having a cover glass surface 523. One or more touch sensing electrodes 517 may be positioned on the cover glass 524 opposite the cover glass surface 523 in a display area 516, oriented toward the cover glass surface 523. The touch sensing electrodes 517 may operate as capacitive touch sensors, ultrasonic touch sensors, and/or utilize any touch sensing technology. The display area 516 may be an area of the touch display 102 where images (e.g., a user interface, photographs, applications, and so on) may be presented and viewed through the cover glass surface 523.

An opaque material 518 (such as black ink) may be disposed on an area of the cover glass 524 outside the display area 516 in order to block various components from view. Such components may include an antenna element 520 mounted on a support structure 521 positioned in a cavity 522 of the cover glass 524. Such components may also include the electrode 519 positioned in the cavity 522 on the opaque material 518.

The electrode 519 may be oriented differently from the touch sensing electrode(s) 517. As shown, the electrode 519 may be oriented toward the cover glass edge surface 103 instead of the cover glass surface 523.

A capacitance of the electrode 519 may be measured (such as by the processing unit 840 of FIG. 8). The capacitance of the electrode 519 may change based on proximity or touch of an object (such as a user's finger or a conductive stylus) to the edge 103. As such, the measured capacitance of the electrode 519 may be used to detect when the object is touching and/or proximate to the edge 103.

Figure 7:
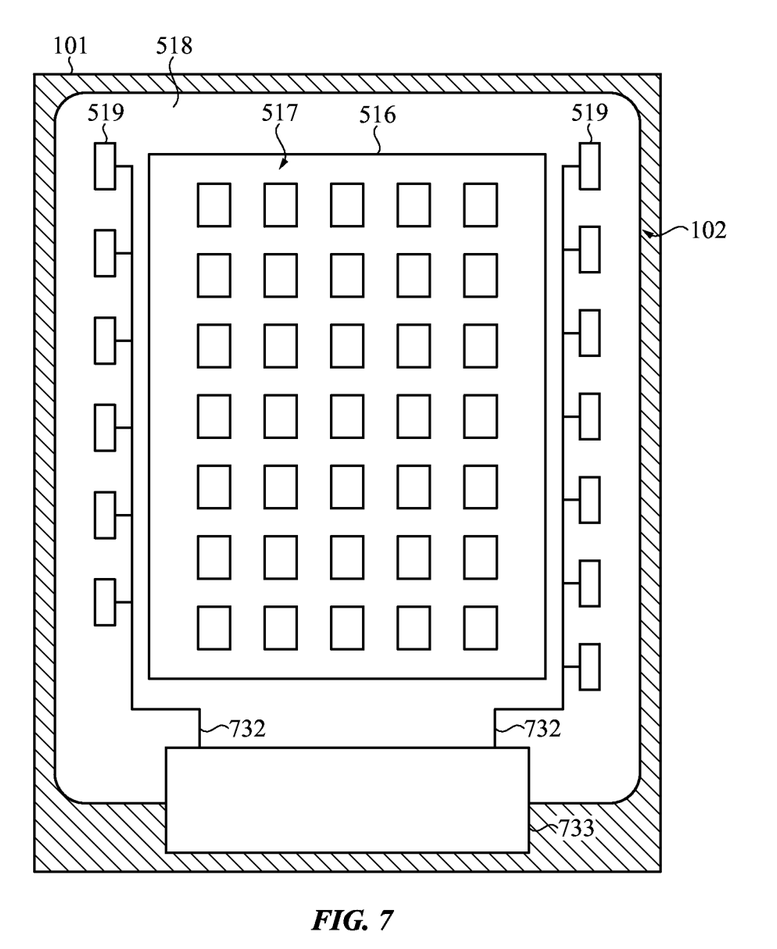
FIG. 7 shows a cross-sectional view of an example of the electronic device of FIG. 1, taken along the line B-B of FIG. 1.

The electrode 519 may be a number of electrodes positioned variously around the cover glass 524 in the cavity 522 such that touch and/or proximity at various points around the cover glass edge surface 103 may be determined. For example, FIG. 7 is a cross-sectional view of the electronic device 100 of FIG. 1, taken along the line B-B of FIG. 1, showing the underside of the touch display 102. FIG. 7 illustrates the opaque material 518, the electrodes 519, the display area 516, and the touch sensing electrodes 517. As shown, the electrodes 519 may be electrically coupled to a flex circuit 733 that is bonded to the touch display 102 and/or the housing 101 by signal lines 732 (which may include and/or couple to traces, hot bar, anisotropic conductive film pad, indium tin oxide, board-to-board connectors, zero insertion force connectors, and so on).

Returning again to FIG. 5, the electrode 519 is shown as directly applied to the opaque material 518 in the cavity 522. In some implementations, the electrode 519 may be conductive paste (such as silver paste), sputter conductor, indium tin oxide, metal foil, or other such material applied to the opaque material 518.

However, it is understood that this is an example and the electrode 519 may be disposed in the cavity 522 by other mechanisms without departing from the scope of the present disclosure. In one example, the electrode 519 may be disposed on a non-conductive structure (such as a cylindrical structure) positioned in the cavity 522. In another example, the electrode 519 may be laminated to (and/or otherwise disposed on) a flex circuit positioned in the cavity 522.

In yet another example, the electrode 519 may be disposed on the support structure 521 with the antenna element 520. In such an example, the electrode 519 may be formed on the support structure 521 by various processes such as sintering, physical vapor deposition, ink nozzle, and so on. Further, in such an example, various techniques may be utilized to prevent or reduce interference between the electrode 519 and the antenna element 520. In some cases, various forms of shielding may be used to prevent or reduce interference between the electrode 519 and the antenna element 520. Additionally or alternatively, the electrode 519 and the antenna element 520 may be operated at different times, different frequencies, and so on to prevent or reduce interference between the electrode 519 and the antenna element 520.

Although FIG. 5 is illustrated and described as including both the combined proximity and force sensor 510 the proximity/touch sensor that utilizes the electrode 519, it is understood that this is an example. In various implementations, the electronic device may include one of these without including both and/or may include other force sensors, proximity sensors, touch sensors, and so on.

FIG. 8 is a block diagram illustrating example functional relationships between example components of the electronic device 100 of FIG. 1. The electronic device 100 may include one or more processing units 840, one or more communication components 842 (which may utilize the antenna element 520), one or more non-transitory storage media 841 (which may take the form of, but is not limited to, a magnetic storage medium; optical storage medium; magneto-optical storage medium; read only memory; random access memory; erasable programmable memory; flash memory; and so on), and/or one or more input/output components 843. The input/output component 843 may be able to receive input and/or provide output via one or more input/output devices such as the input mechanism 104 and 105, the touch display 102, the combined proximity and force sensor 510, and so on.

In some implementations, the combined proximity and force sensor 510 and/or other sensors may produce one or more signals indicating changes in capacitance between various electrodes. These signals may be transmitted to the processing unit 840 (which may be operably connected thereto, such as via the flex circuit 733). The processing unit 840 may correlate these changes in capacitance to an amount of force applied to a cover glass surface of the touch display 102, detect proximity based on these changes in capacitance, and so on.

Figure 9:
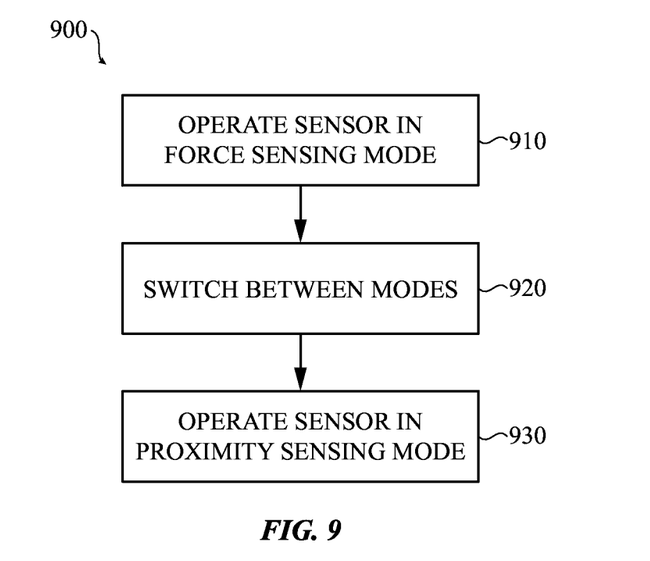
FIG. 9 shows a flow chart illustrating an example method for controlling a combined proximity and force sensor. This example method may be performed by the electronic device of FIGS. 1-4, 5-6, and 8.

FIG. 9 is a flow chart illustrating an example method 900 for controlling a combined proximity and force sensor. This example method 900 may be performed by the electronic device of FIGS. 1-4, 5-6, and 8.

At 910, a combined proximity and force sensor may be operated in a force sensing mode. For example, the combined proximity and force sensor may determine an applied force based on a first change in capacitance between a first electrode and a second electrode while using a third electrode as a force sensing grounding shield.

At 920, the combined proximity and force sensor may switch between the force sensing mode and a proximity sensing mode. The combined proximity and force sensor may switch between the force sensing and proximity sensing modes any time the combined proximity and force sensor is operated in one of the modes and is then operated in the other mode. In some examples, the combined proximity and force sensing cycles may be performed wherein a portion of each combined proximity and force sensing cycle includes operating for a first period of time in the force sensing mode and a second period of time in the proximity sensing mode.

In some implementations, the combined proximity and force sensor may repeatedly cycle between the force sensing mode and the proximity sensing mode. In other implementations, the combined proximity and force sensor may operate in the proximity sensing mode and then cycle once proximity is detected. In still other implementations, the combined proximity and force sensor may operate in the force sensing mode and may cycle once force is detected.

At 930, the combined proximity and force sensor may be operated in the proximity sensing mode. For example, the combined proximity and force sensor may sense proximity of an object based on a second change in capacitance of the third electrode while using the first electrode and/or the second electrode as a proximity sensing ground shield.

Although the example method 900 is illustrated and described as including particular operations performed in a particular order, it is understood that this is an example. In various implementations, various orders of the same, similar, and/or different operations may be performed without departing from the scope of the present disclosure.

For example, the example method 900 is illustrated as a linear sequence. However, in various implementations the combined proximity and force sensor may be operated in either the force sensing mode as shown at 910 or the proximity sensing mode as shown at 920 and then switched to the other mode as shown at 930 at any time without departing from the scope of the present disclosure.

Figure 10:
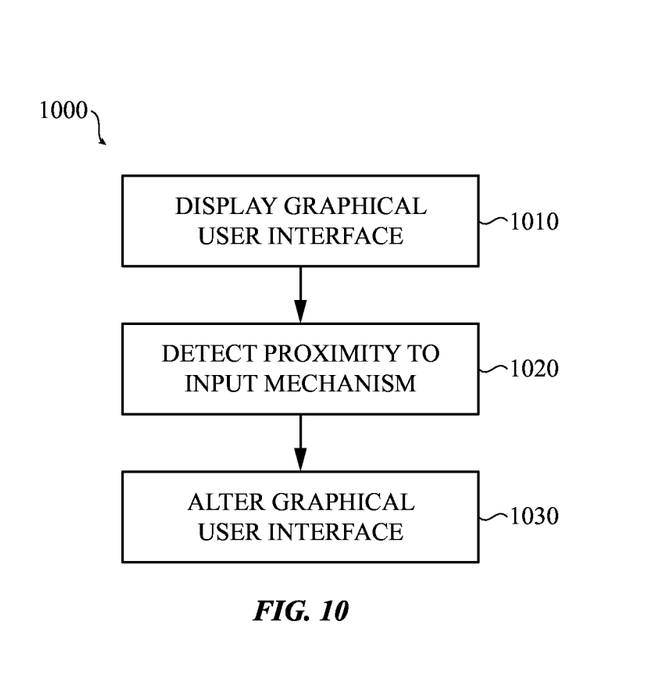
FIG. 10 shows a flow chart illustrating an example method for altering a graphical user interface based on proximity to an input mechanism. This example method may be performed by the electronic device of FIGS. 1-8.

FIG. 10 is a flow chart illustrating an example method 1000 for altering a graphical user interface based on proximity to an input mechanism. This example method 1000 may be performed by the electronic device of FIGS. 1-8.

At 1010, a graphical user interface may be displayed. The graphical user interface may include one or more displayed elements.

At 1020, proximity to an input mechanism may be detected. The proximity may be the proximity of an object, such as a user's finger or a conductive stylus, to the input mechanism. The input mechanism may be one or more knobs, buttons, keys, touch surfaces, and/or any other input mechanism (e.g., the input mechanism 104 of FIG. 1).

At 1030, the graphical user interface may be altered. The graphical user interface may be altered based on the detected proximity to the input mechanism. For example, the alteration of the graphical user interface may include changing a displayed element of the graphical user interface. The displayed element may be an element that is alterable by manipulation of the input mechanism. The displayed element may be changed to indicate alterations that may be made by different manipulations of the input mechanism, such as the alteration that may occur if the input mechanism is pressed as opposed to rotated, rotated in a first direction as opposed to a second, and so on. By way of another example, the graphical user interface may not be presented (e.g., the touch display may be off) during a sleep or other low power state and may be altered to present the graphical user interface (or an unlock screen) when the proximity is detected.

Although the example method 1000 is illustrated and described as including particular operations performed in a particular order, it is understood that this is an example. In various implementations, various orders of the same, similar, and/or different operations may be performed without departing from the scope of the present disclosure.

For example, 1020 is illustrated and described as detecting proximity to the input mechanism. However, in various implementations touch of the input mechanism may be determined instead proximity to the input mechanism without departing from the scope of the present disclosure.

Figure 11:
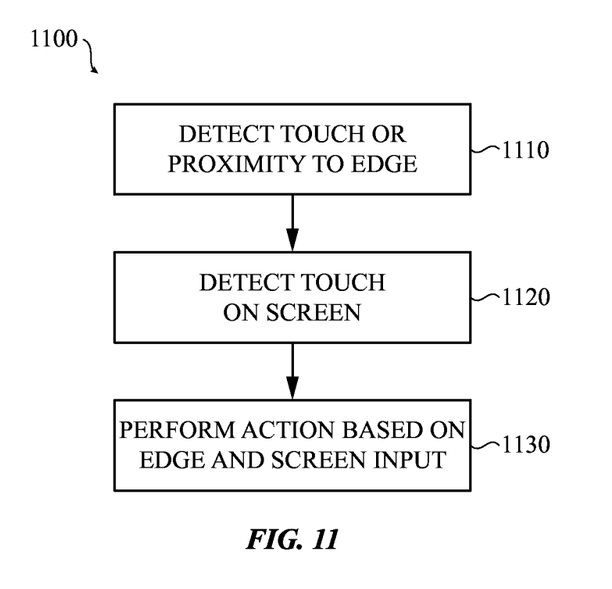
FIG. 11 shows a flow chart illustrating an example method for performing actions using combined touch screen and proximity or edge touch input. This example method may be performed by the electronic device of FIGS. 1-8.

FIG. 11 is a flow chart illustrating an example method 1100 for performing actions using combined touch screen and proximity or edge touch input. This example method 1100 may be performed by the electronic device of FIGS. 1-8.

At 1110, proximity or touch to an edge may be detected. The edge may be a cover glass edge, the edge of a touch display, the edge of an electronic device adjacent to a touch display, and so on. The proximity or touch may be proximity of or touch by an object, such as a user's finger or a conductive stylus.

At 1120, one or more touches may be detected on a touch display. The detected touch may be touch by an object, such as a user's finger or a conductive stylus.

At 1130, an action may be performed or initiated based on the edge and touch input (the detected proximity and touches). The action may be performed or initiated based on a combination of the edge and the touch input. The detected proximity and touches may be interpreted as one or more gestures.

For example, a touch to an edge of a touch display may be detected that then slides partway across the touch display. An action performed or initiated based on this detected touch can be different from an action that is performed or initiated when a sliding touch is detected on the touch display without first detecting a touch on the edge.

Although the example method 1100 is illustrated and described as including particular operations performed in a particular order, it is understood that this is an example. In various implementations, various orders of the same, similar, and/or different operations may be performed without departing from the scope of the present disclosure.

For example, 1110 and 1120 are illustrated and described as separate, linear operations. However, in various implementations touch and/or proximity to an edge and touch on a touch display may occur and be detected simultaneously and/or in various overlapping and/or other orders without departing from the scope of the present disclosure.

Figure 12:
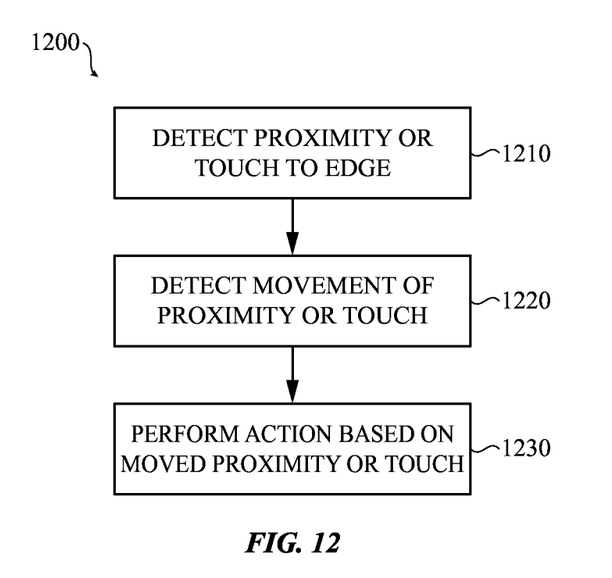
FIG. 12 shows a flow chart illustrating an example method for performing actions using moving edge proximity or touch input. This example method may be performed by the electronic device of FIGS. 1-8.

FIG. 12 is a flow chart illustrating an example method 1200 for performing actions using moving edge proximity or touch input. This example method 1200 may be performed by the electronic device of FIGS. 1-8.

At 1210, proximity or touch to an edge may be detected. The edge may be the edge of a touch display, the edge of an electronic device adjacent to a touch display, and so on. The proximity or touch may be proximity of or touch by an object, such as a user's finger or a conductive stylus.

At 1220, movement of the proximity or touch may be detected. The movement may be in one or more directions along the edge.

At 1230, an action may be performed or initiated based on the detected movement of the proximity or touch along the edge. The detected movement of the proximity or touch may be interpreted as one or more gestures. For example, a menu may be scrolled in a direction corresponding to the direction of the detected movement of the proximity or touch along the edge. By way of another example, a volume may be increased or decreased corresponding to the direction of the detected movement of the proximity or touch along the edge.

Although the example method 1200 is illustrated and described as including particular operations performed in a particular order, it is understood that this is an example. In various implementations, various orders of the same, similar, and/or different operations may be performed without departing from the scope of the present disclosure.

For example, 1210 and 1220 are illustrated and described as separate, linear operations. However, in various implementations detection of proximity or touch and detection of movement of such proximity or touch may be performed simultaneously and/or in various overlapping and/or other orders without departing from the scope of the present disclosure.

As described above and illustrated in the accompanying figures, the present disclosure relates to proximity and/or touch sensing of edges of an electronic device. In various implementations, a combined proximity and force sensor may include first and second electrodes separated by a compressible material and an additional third electrode. The combined proximity and force sensor may operate in a force sensing mode by determining an applied force based on a first change in capacitance between the first and second electrodes related to compression of the compressible material. In this force sensing mode, the third electrode may function as a force sensing ground shield. The combined proximity and force sensor may operate in a proximity sensing mode by sensing proximity of an object based on a second change in capacitance of the third electrode. In this proximity sensing mode, the first and/or second electrodes may function as a proximity sensing ground shield. In this way, components of a combined proximity and force sensor may be used to detect both touch and force by using the components to perform different functions at different times.

In some implementations, an electronic device may include a touch display. The touch display may include a cover glass with a cover glass surface having a display area, a cover glass edge surface, and a cavity formed around a perimeter of the touch display. One or more capacitive or other touch sensing electrodes may be positioned on the cover glass opposite the cover glass surface in the display area, oriented toward the cover glass surface. The cover glass may also include an opaque material positioned in the cavity and one or more electrodes positioned on the opaque material, oriented toward the cover glass edge surface. The electronic device may detect touch or proximity to the cover glass edge surface based on a change in capacitance of the electrode. In this way, touch and/or proximity to the edge of the electronic device may be utilized as input in addition to touch to the display area.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A combined proximity and force sensor, comprising:
a first electrode;
a second electrode;
a compressible material separating the first and the second electrodes; and
a third electrode coupled to the first electrode and positioned so that the first electrode is between the second electrode and the third electrode;
wherein the combined proximity and force sensor is operable to:
produce a first change in capacitance between the first and the second electrodes related to compression of the compressible material while the third electrode functions as a force sensing ground shield, the first change in capacitance usable by a processing unit to determine an applied force; and
produce a second change in capacitance of the third electrode while the first electrode functions as a proximity ground shield, the second change in capacitance usable by the processing unit to sense proximity of an object.

2. The combined proximity and force sensor of claim 1, further comprising a fourth electrode wherein the second change in capacitance is a change in mutual capacitance between the third electrode and the fourth electrode.

3. The combined proximity and force sensor of claim 2, wherein the fourth electrode is disposed on at least one of:
a cavity formed partially into a cover glass of an electronic device, the electronic device incorporating the combined proximity and force sensor; or
an input mechanism of the electronic device.

4. The combined proximity and force sensor of claim 1, wherein the third electrode comprises multiple third electrodes positioned at select locations around a perimeter of a cover glass of an electronic device and the combined proximity and force sensor is operable to produce changes in capacitance of each of the multiple third electrodes separately.

5. The combined proximity and force sensor of claim 1, wherein the second electrode functions as an additional proximity ground shield while the combined proximity and force sensor produces the second change in capacitance.

6. The combined proximity and force sensor of claim 1, wherein the combined proximity and force sensor is positioned between a cover glass and a housing of an electronic device to function as a gasket.

7. The combined proximity and force sensor of claim 1, wherein the proximity of the object is to an input mechanism of an electronic device, wherein the input mechanism is adjacent to the combined proximity and force sensor.

8. The combined proximity and force sensor of claim 1, wherein the combined proximity and force sensor produces the first and second changes in capacitance at different times.

9. An electronic device, comprising:
a housing;

a cover glass positioned adjacent to the housing, the cover glass including:
  a cover glass surface having a display area;
  a cover glass edge surface; and
  a cavity formed partially into the cover glass opposite the cover glass surface apart from the display area;
a capacitive touch sensing electrode positioned on the cover glass opposite the cover glass surface in the display area, oriented toward the cover glass surface;
an additional electrode positioned in the cavity, oriented toward the cover glass edge surface; and
a processing unit connected to the additional electrode that is operable to detect touch or proximity of an object to the cover glass edge surface based on a change in capacitance between the additional electrode and the object.

10. The electronic device of claim 9, wherein the additional electrode is laminated to a flexible circuit positioned in the cavity.

11. The electronic device of claim 9, wherein the additional electrode is disposed on a non-conductive structure that is adhered to the cavity.

12. The electronic device of claim 9, further comprising an antenna element positioned in the cavity wherein the additional electrode is disposed on a support structure of the antenna element positioned in the cavity.

13. The electronic device of claim 9, further comprising an opaque material positioned in the cavity wherein the additional electrode is positioned on the opaque material.

14. The electronic device of claim 9, wherein the additional electrode comprises at least one of conductive paste, sputter conductor, indium tin oxide, or metal foil applied to the opaque material.

15. The electronic device of claim 9, wherein the additional electrode comprises multiple electrodes and the electronic device is operable to detect touch of an area corresponding to or proximity to one of the multiple electrodes based on a change in capacitance of the respective electrode.

16. A method of controlling a combined proximity and force sensor, comprising:
  operating the combined proximity and force sensor in a force sensing mode by determining an applied force based on a first change in capacitance between a first electrode and a second electrode of the combined proximity and force sensor while using a third electrode of the combined proximity and force sensor as a force sensing ground shield;
  operating the combined proximity and force sensor in a proximity sensing mode by sensing proximity of an object based on a second change in capacitance of the third electrode while using the first electrode as a proximity sensing ground shield; and
  switching the combined proximity and force sensor between the proximity sensing mode and the force sensing mode.

17. The method of claim 16, wherein said switching the combined proximity and force sensor between the proximity sensing mode and the force sensing mode comprises:
  performing combined proximity and force sensing cycles wherein a portion of each proximity and force sensing cycle comprises operating for a first period of time in the force sensing mode and a second period of time in the proximity sensing mode.

18. The method of claim 16, further comprising changing a displayed element of a user interface based on the sensed proximity.

19. The method of claim 18, wherein the sensed proximity is to an input mechanism and the displayed element of the user interface is alterable by manipulating the input mechanism.

20. The method of claim 16, further comprising initiating an action based on a combination of the sensed proximity and a detected touch input.

\* \* \* \* \*